(12) United States Patent
Petterson

(10) Patent No.: US 7,164,962 B2
(45) Date of Patent: Jan. 16, 2007

(54) METHOD AND APPARATUS FOR FITTING BRASSIERES

(76) Inventor: Kevin Petterson, #3-51422 RR 261, Spruce Grove, Alberta (CA) T7Y 1B4

( * ) Notice: Subject to any disclaimer, the term of this patent is extended or adjusted under 35 U.S.C. 154(b) by 6 days.

(21) Appl. No.: 10/908,457

(22) Filed: May 12, 2005

(65) Prior Publication Data

US 2006/0259179 A1 Nov. 16, 2006

(51) Int. Cl.
*G06F 19/00* (2006.01)

(52) U.S. Cl. .................................................. 700/132

(58) Field of Classification Search ............. 700/130, 700/132; 705/27
See application file for complete search history.

(56) References Cited

U.S. PATENT DOCUMENTS

| | | | |
|---|---|---|---|
| 2,527,206 A | 10/1950 | Arnyot | |
| 2,559,501 A | 7/1951 | Graf | |
| 2,575,343 A | 11/1951 | Heiman | |
| 2,946,125 A | 7/1960 | Gittelson | |
| 3,292,261 A | 12/1966 | Hayes | |
| 4,454,409 A | 6/1984 | Sehres | |
| 5,163,006 A * | 11/1992 | Deziel | 700/132 |
| 5,414,943 A | 5/1995 | Vogt | |
| 5,485,855 A | 1/1996 | Shiraiwa et al. | |
| 5,619,804 A | 4/1997 | Vogt et al. | |
| 5,680,528 A | 10/1997 | Korszun | |
| 5,965,809 A | 10/1999 | Pechter | |
| 6,272,761 B1 | 8/2001 | Pechter | |
| 6,276,069 B1 | 8/2001 | Chadwick et al. | |
| 6,313,745 B1 | 11/2001 | Suzuki | |
| 6,336,839 B1 | 1/2002 | Valli | |
| 6,467,180 B1 | 10/2002 | Chan | |
| 6,640,460 B1 | 11/2003 | Nabarro et al. | |
| 6,665,577 B1 | 12/2003 | Onyshkevych et al. | |
| 6,701,207 B1 | 3/2004 | Gazzuolo | |
| 6,820,478 B1 | 11/2004 | Nabarro et al. | |
| 2003/0115110 A1 | 6/2003 | Yano et al. | |
| 2004/0049435 A1 * | 3/2004 | Nabarro | 705/27 |

FOREIGN PATENT DOCUMENTS

| | | |
|---|---|---|
| CA | 2228423 | 2/1997 |
| CA | 2267499 | 4/1998 |
| CA | 2193869 | 6/1998 |
| CA | 2346116 | 4/2000 |
| CA | 2302895 | 9/2001 |
| CA | 2372396 | 8/2002 |
| CA | 2359513 | 4/2003 |
| FR | 1490325 | 7/1967 |
| GB | 834469 | 5/1960 |
| GB | 885976 | 1/1962 |

(Continued)

*Primary Examiner*—Danny Worrell
(74) *Attorney, Agent, or Firm*—Bennett Jones LLP

(57) ABSTRACT

The invention relates to an apparatus and method for assisting a customer with the fitting of a bra. More particularly to an apparatus and method for bra selection and fitting utilizing an interactive system of data collection, data analysis and data output. The apparatus and method permits the collection of relevant personal information (including measurement information) to assist with the fitting process, and also educates the customer on how to select a properly fitting bra and on issues relating to bra wear. Through a method of education and an interactive system of collecting data and providing feedback on fit, the apparatus and method allows untrained women to properly select and fit a bra in a private and anonymous environment. This invention can also facilitate the collection of data from the responses and inputs of the customers.

42 Claims, 4 Drawing Sheets

FOREIGN PATENT DOCUMENTS

| | | |
|---|---|---|
| GB | 1468762 | 3/1977 |
| GB | 2201579 | 9/1988 |
| GB | 2304194 | 12/1997 |
| WO | WO 98/25242 | 6/1998 |
| WO | WO 98/38589 | 9/1998 |
| WO | WO 99/67730 | 12/1999 |
| WO | WO 00/52416 | 9/2000 |
| WO | WO 01/31600 A1 | 5/2001 |
| WO | WO 01/43034 A2 | 6/2001 |
| WO | WO 02/39052 | 5/2002 |
| WO | WO 02/39052 A1 | 5/2002 |
| WO | WO 02/50736 A1 | 6/2002 |
| WO | WO 02/054178 A2 | 7/2002 |
| WO | WO 02/076251 A2 | 10/2002 |

* cited by examiner

METHOD AND APPARATUS FOR FITTING BRASSIERES

FIELD OF INVENTION

The present invention relates to an apparatus and method for assisting a customer with the fitting of a brassiere. More particularly to an apparatus and method for brassiere fitting and selection, through an interactive system of data collection, data analysis and data output.

BACKGROUND OF THE INVENTION

The process of bra fitting is complicated by variations in size, shape and disposition of breasts, by the amorphous nature of breasts themselves, and by the fact that many women are never measured for bra size, either professionally or otherwise. Further, most women are not instructed or educated on how a bra should fit. This is especially true for young women who purchase their first brassiere and are typically too uncomfortable with professional fitting and other methods to seek advice. When buying a bra, most women rely on previous experience roughly estimating the size that is required. This process will always be an approximation as changes occur to the size and shape of breasts at different times during the life of a woman. (for example changes in breast size occur during and after pregnancy).

A bra is typically chosen by selection of a favorite style or make, regardless of the accuracy of the fit. As a result, the customer is likely to purchase a bra that will fit improperly and which could lead to discomfort and other negative health side effects in the future. Another negative of this method of selection is that the retailer and manufacturer are likely to have no knowledge of common fitting problems for a specific product, and thus will be unable to prevent similar situations in the future.

The difficulty of finding a correct fitting bra is further compounded by the problem that a lot of women fall in between available standard sizes, and further the standard sizes are often not uniform between makes and styles of bras. The composition and components of a bra, such as its elastane or Lycra™ content, or features such as underwires also affect the fit of a bra and have to be taken into account when choosing the correct size.

Poorly fitting bras are uncomfortable and often provide insufficient support. This can cause adverse effects on posture, breast tissue and breast shape over time and can even lead to numerous other physical effects including headaches, back pain, breast tenderness, poor circulation, shoulder strain, skin chaffing and lymphedema. The correct fitting bra is especially important while breasts are developing during the teenage years and incorrect fitting during this time can lead to complications in later years.

To try and solve these problems, some retail outlets provide a personal bra measuring service whereby measurements are done by a sales representative either with or without a bra being worn by the customer. A significant problem of this process is that many women feel uncomfortable about being measured by a stranger. As a result women are hesitant and reluctant to use the service. Another problem with such service is that although the sales representative is able to provide interactive advice to a customer, the advice provided is limited to the individual sales representative's knowledge of proper fitting techniques, and upon their knowledge of the manufacturers' products and inventory. Further, in a busy store individual consulting services are limited by the number of available sales representatives.

Self-measuring charts and instructions have also been used to address some of these problems. These generally involve measuring the circumference of the torso under the breasts to obtain a torso measurement, followed by taking a measurement across the breasts at the largest point. These measurements are then generally inserted into a formula to work out a nominal torso and bra cup size. However, these measurements are limited in usefulness and only provide guidance with respect to suggested fit with great variation still existing even in situations of accurate measurement. Also, due to a lack of proper education and direction, the initial measurements themselves are often done incorrectly and are therefore often imprecise. These basic uniform measurements do not provide the level of insight required to properly fit a bra as they do not account for variations in aspects such as depth, width of cleavage breast shape and asymmetry of breasts.

Other attempted solutions have included the development of breast measuring devices such as tapes and harnesses. These devices can be complicated to use and the limited data that they generate can only be utilized to provide suggested sizes. Further, if used incorrectly, the data generated will lead to the suggestion of the wrong type of bra for the customer.

Another suggested solution has been the creation of databases containing information obtained from the manufacturer on specific bra products. The customer inputs specific data (often 2 or 3 size measurements) and the database outputs suggested products. These databases have a limited scope and only generate information regarding suggested sizes and products. Further, the existing databases do not provide interactive feedback during the fitting and trying on process.

What is needed is an apparatus and method for assisting customers with the selection and fitting of a bra that combines the benefits of the interactive feedback and personalized advice provided by an individual sales clerk, and the benefits of self measuring devices and databases, but which overcomes the shortfalls associated with each.

SUMMARY OF THE INVENTION

The present invention is directed to an interactive database system that guides the customer through the bra fitting process with interactive and personalized information, and which can be utilized by a customer in the privacy of a changing room or the home. Accordingly, in one aspect of the invention, the invention comprises a method of assisting a customer with the fitting of a bra, the method comprising the steps of:

(a) the interactive input of information by the customer;
(b) the search and retrieval of information from an electronic database based on the information input by the customer, the electronic database containing product information and educational information; and
(c) the output of the information retrieved from the electronic database to the customer.

In embodiments of the present invention the educational information includes information about; fitting and wearing a bra, the proper method for putting on a bra, methods of fit and wear relating to special situations, proper fits and methods of wear for various types and styles of bras, physical problems related to bra wearing in general and related to wearing the wrong size of bra, possible solutions to physical problems related to bra wearing, wearing the wrong size of bra, proper self-measurement of the breasts for the purposes of attaining a properly fitting bra and fashion information. In further embodiments, the product information includes information about; varying styles and types of bras, inventory information about specific bra products, proper wear and fashion and information about the dimensions of varying styles and sizes of bras. In one embodiment the information inputted by the customer includes personal information, and in a further embodiment the personal information includes self-measurement data. In an embodiment of the present invention a measuring device may be used to obtain the self-measurement data. The personal information input by the customer may include information about the fit and feel of bras that the customer is trying on, information about desired styles of bra and intended uses and information about the customer's history of bra wear. In one embodiment the customer inputs information using a user interface. The interface may be located in a fitting room or other private area within a store, or in the customer's home. In an embodiment the information retrieved from the electronic database is output to the customer using the user interface, and in another embodiment the information retrieved from the electronic database is output to the customer using any of the following mediums; digital images, photographs, diagrams, descriptions, video, text or audio stimuli.

In one embodiment the method comprises the further step of outputting prompts or questions to the customer to elicit the input of specific information by the customer. The questions and prompts may be visually displayed on the user interface or may comprise audio stimuli. In one embodiment the customer is guided through a self-measurement process by following the prompts and questions. In further embodiments, the questions include questions about any of; the customer's history of bra wear, the problems normally associated with bra wear; and the problems not normally associated with bra wear. The questions may include questions about special circumstances and conditions that could impact the fit, wear or selection of a bra.

In an embodiment the questions and prompts presented to the customer about the feel and fit of the bra are directed towards determining any number of the following; the proper angle of the bra, the proper center front fit, the proper frame and side fitting or positioning, the proper strap selection, the proper adjustment and placement; and the proper positioning and fit of the cups.

In one embodiment the method further comprises the step of recording the information input by the customer.

In another aspect of the invention, the invention comprises a method of assisting a customer with the fitting of a bra, the method comprising the steps of:
  (a) the input of personal information by a customer;
  (b) the search and retrieval of information from an electronic database based on the information input by the customer, the electronic database containing product information and educational information;
  (c) the output of the information retrieved from the electronic database to the customer;
  (d) the customer selecting a bra to try on based on the information provided by the database;
  (e) the customer trying the bra on;
  (f) the input of information about the feel and fit of the bra by the customer;
  (g) the search and retrieval of information from the electronic database based on the information input by the customer;
  (h) the output of the information retrieved from the electronic database to the customer; and
  (i) if the feel and fit of the bra is not correct, repeat steps (d)–(h) until the customer has tried on a correctly fitting bra.

In another aspect of the invention, the invention comprises a method of assisting a customer with the fitting of a bra, the method comprising the steps of:
  (a) the input of personal information by a customer using a user interface in response to questions and prompts displayed on the user interface;
  (b) the search and retrieval of bra product information and educational information on bras and bra fitting from an electronic database based on the personal information provided by the customer;
  (c) the output of the retrieved bra product information, or the educational information, or both, depending on customer selection to the customer through the user interface;
  (d) the customer selecting a bra to try on using the retrieved bra product information, or the educational information, or both;
  (e) the customer trying on the bra;
  (f) the input of information about the feel and fit of the bra by the customer using the user interface in response to questions and prompts displayed on the interface;
  (g) the search and retrieval of bra product information and educational information on bras and bra fitting from the electronic database based on the information about the feel and fit of the bra input by the customer;
  (h) the output of the retrieved bra product information, or the educational information, or both, depending on customer selection to the customer through the user interface; and
  (i) the selection of a correctly fitting bra by the customer.

In one embodiment, the apparatus of the present comprises a networked server system for assisting a customer with the fitting of a bra comprising:
  (a) a remote work station comprising a data storage medium including a memory database comprising information about bra products, educational information on bras and bra fitting, questions about personal information of the customer, and questions about the fit and feel of a bra and a means for searching and retrieving specific data from the database in response to information input by the customer
  (b) means for the customer to input information to the remote work station; and
  (c) means for communicating the data retrieved from the database to the customer.

In one embodiment the network is the world wide web, LAN or WAN.

In another aspect of the invention, the invention comprises a computer system for assisting a customer with the fitting of a bra comprising:
  (a) a data storage medium including a memory database comprising information about bra products, educational information on bras and bra fitting, questions about personal information of the customer, and questions about the fit and feel of a bra;
  (b) means for the customer to input information;
  (c) selection means for searching and retrieving specific data from the database in response to the information input by the customer; and
  (d) means for communicating the data retrieved from the database to the customer.

In one embodiment the apparatus has a means of storing the information inputted by a customer. In another embodiment the apparatus has a scanner for identifying products by scanning the tags on products. In an embodiment the apparatus has a measuring device for obtaining personal measurement information from the customer. In one embodiment the means for the customer to input information and the means of communicating the data comprises a user interface.

In a further aspect of the invention, the invention comprises a computer program stored on a computer readable medium for assisting a customer with the fitting of a bra, said computer program adapted to:
(a) store data including information about bra products, educational information on bras and bra fitting, questions about personal information of the customer, and questions about the fit and feel of a bra;
(b) receive and process information inputted by the customer;
(c) search and retrieve specific data in response to the information inputted by the customer; and
(d) output the retrieved data to the customer.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

A. Definitions

In this patent the term "bra" or "brassiere" may be used interchangeably to mean the same thing, namely a garment of clothing designed closely to fit a wearer's breasts, including but not limited to, other forms of lingerie such as body suits, bustiers, swimwear and sports bras.

B. Description

The method and apparatus according to the Figures comprise an apparatus and method for assisting a customer with the fitting of a bra. More particularly, an apparatus and method for bra selection and fitting utilizing an interactive system of data collection, data analysis and data output. The disclosed apparatus and method permits the collection of relevant personal information (including measurement information) to assist with the fitting process, and also educates the customer on how to select a properly fitting bra and on issues relating to bra wear. Through a method of education and an interactive system of collecting data and providing feedback on fit, the disclosed apparatus and method allows untrained women to properly select and fit a bra in a private and anonymous environment. This invention can also facilitate the collection of data from the responses and inputs of the customers. This information can be analyzed by retailers and manufacturers to better assess their customers' needs and preferences.

The disclosed invention provides an interactive system that leads a customer through a process and series of interactive steps that enable the customer to make an educated selection on their own. This method of fitting is both discrete and anonymous.

Figure 1:
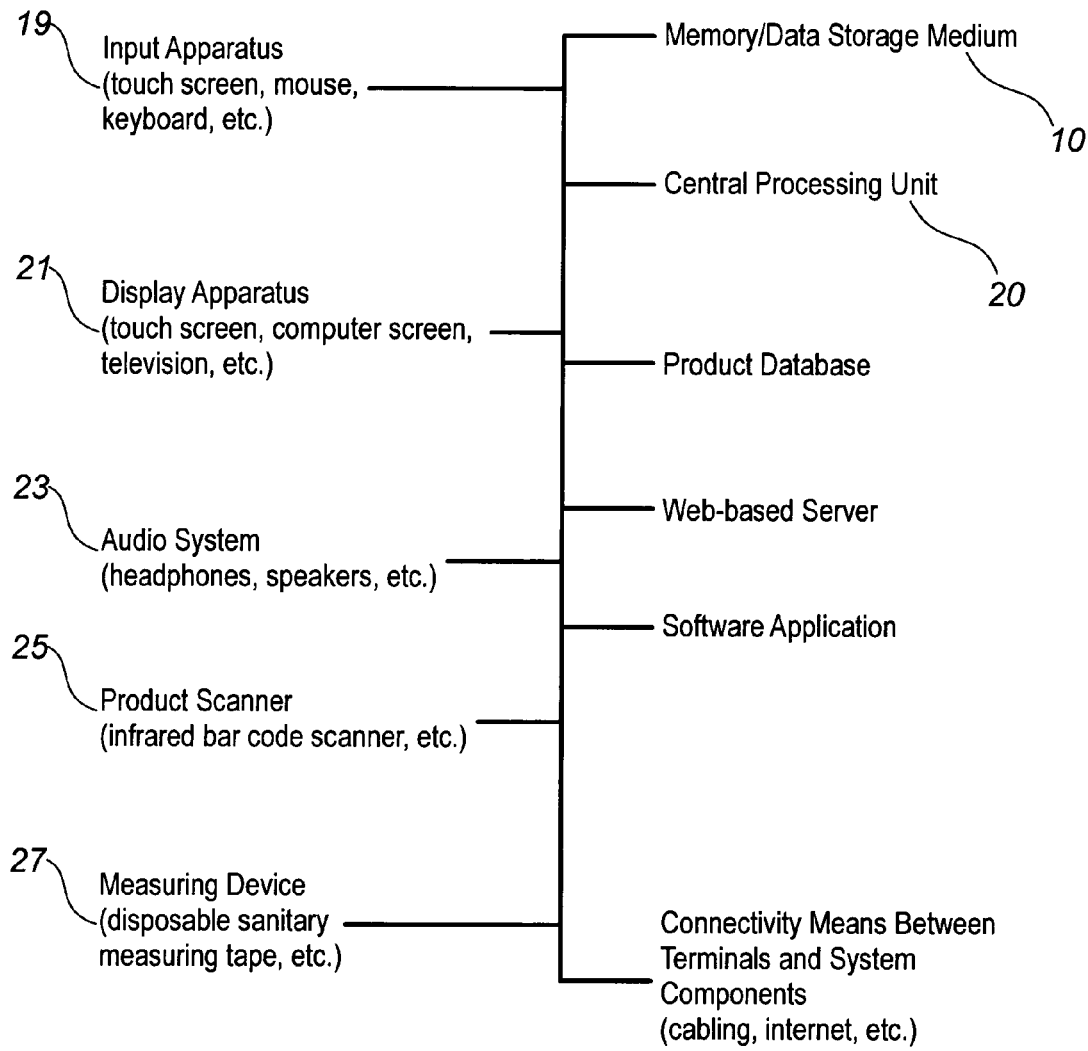
FIG. 1 is a diagram depicting one embodiment of the present invention.

As depicted in FIG. 1, the apparatus comprises data storage means (10) for storing information about bra products, educational information on bras and bra fitting, questions about personal information of the customer, prompts and questions about the fit and feel of a bra. The information storage means may comprise an electronic database containing information on all available product and the crucial size and shape characteristics thereof. The database (10) will further contain all pertinent information for every stock keeping unit of product including various styles, shapes, sizes, materials, patterns, colors, etc. that distinguish all of the products that the retailer offers. This information is used as a reference for suggesting products to customers based on inputs received. The database (10) also stores information relating educational information on bras and bra fitting.

The educational information stored on the database includes information on physical problems associated with wearing a bra such as: adverse effects relating to posture, breast tissue and breast shape, headaches, back pain, breast tenderness, poor circulation, shoulder strain, skin chaffing and lymphedema. The database (10) also comprises educational information on the fit of a bra such as; the proper angle of the bra, the proper center front fit, the proper frame and side fitting or positioning, the proper strap selection, the proper adjustment and placement, and the proper positioning and fit of the cups.

The database (10) also stores questions and prompts that are posed to the customer to elicit the necessary information required to make product suggestions, to select appropriate education information for output to the customer and to guide them through the fitting process. The questions include, amongst others, questions about personal information such as bust measurement, back size and questions about preferences, intended use and historical bra related problems.

Figure 6:
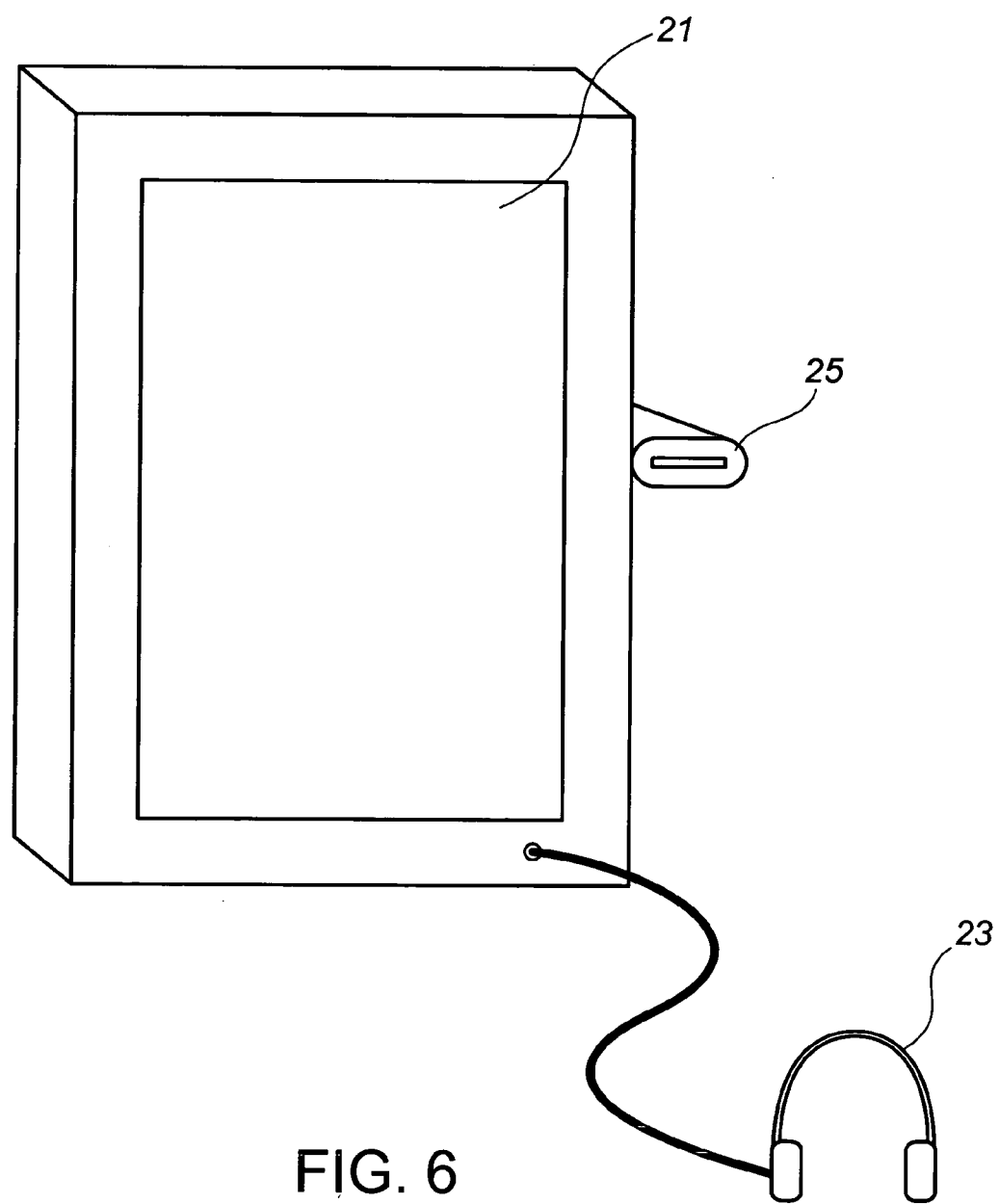
FIG. 6 is a diagram of one embodiment of a user interface.

As shown in FIG. 1, the apparatus further comprises a means for the customer to input of information (19) in response to prompts and questions, and a means for communicating and displaying data (21) to the customer including prompts, questions and information. Information may be input and communicated through a user interface. In one embodiment the user interface is an electronic interface. In a further embodiment the user interface may be an electronic touch screen (21) as shown in FIG. 6, however it could also be a keypad and/or mouse and monitor or a microphone and speakers or earphones (23), or such other suitable interactive user interface means as would be selected by one skilled in the art. The user interface can also be utilized as a marketing tool for displaying advertising or suggesting other related products that the consumer may prefer based on the information entered, for example other matching undergarments or other products in available lines.

Figure 2:
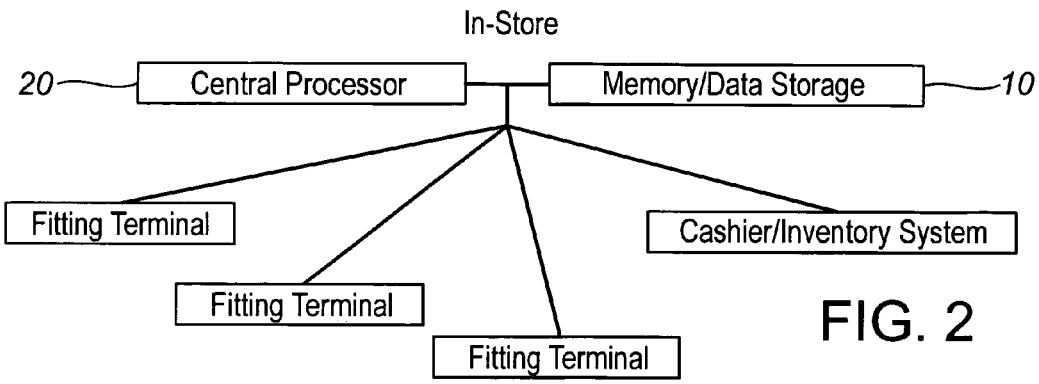
FIG. 2 is a block diagram depicting one embodiment of the present invention.
Figure 3:
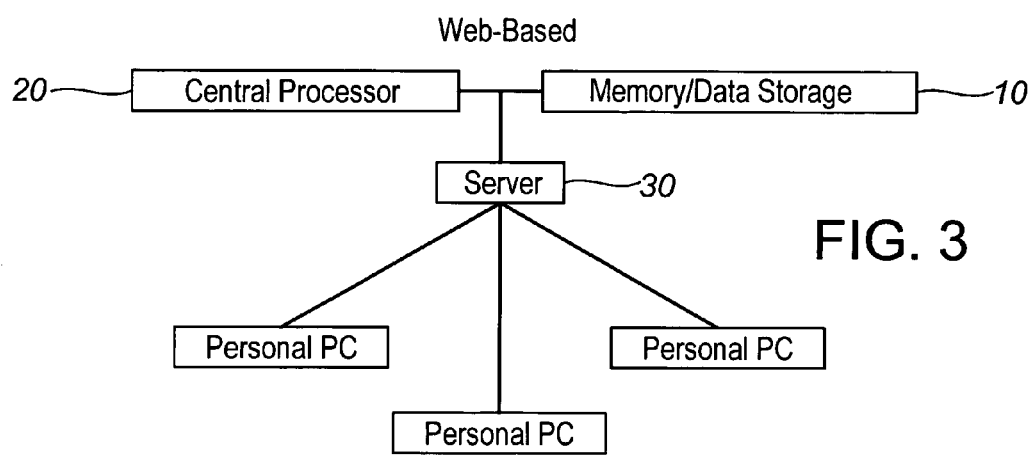
FIG. 3 is a block diagram depicting one embodiment of the present invention.
Figure 4:
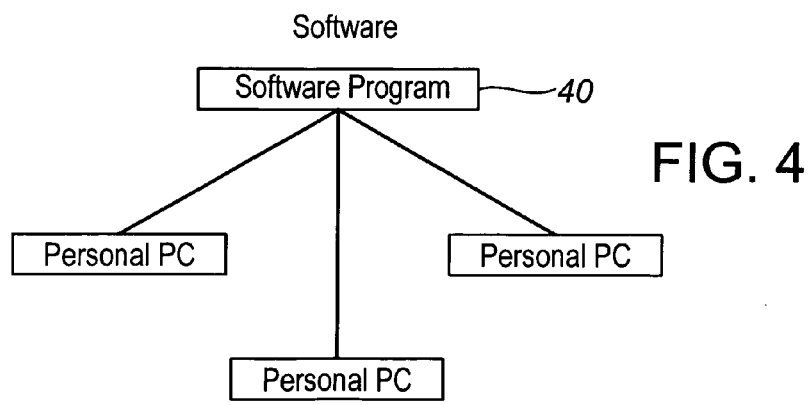
FIG. 4 is a block diagram depicting one embodiment of the present invention.
Figure 5:
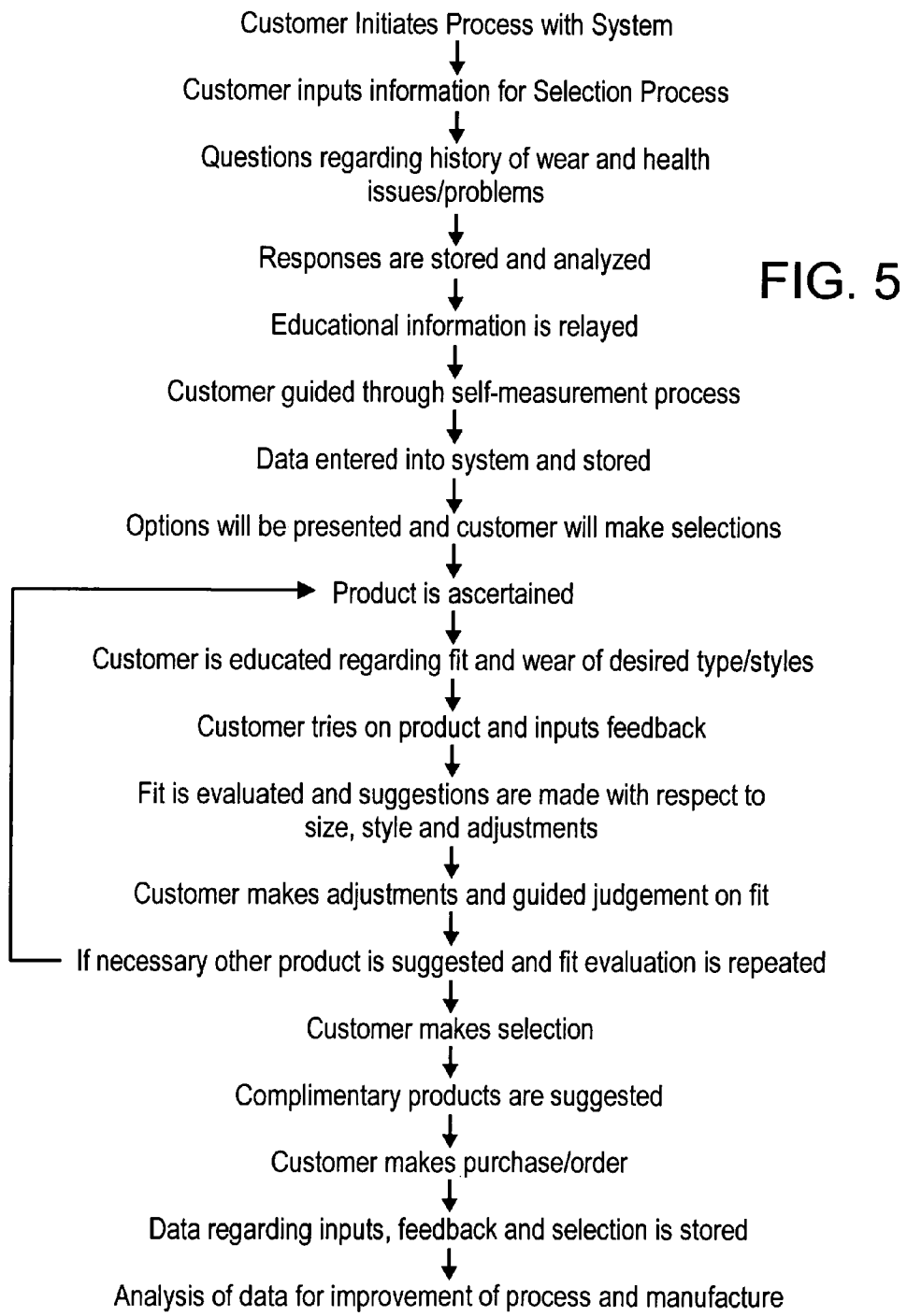
FIG. 5 is a process flow chart illustrating one embodiment of the present invention.

The apparatus has analysis means for processing information input by the customer and selection means for searching for and retrieving specific information, questions or prompts from the database based on the analysis of the information and responses inputted by the customer. The questions and prompts posed to a customer will depend on the prior input and prior responses of the customer. As shown in FIG. 1, the analysis means and selection means may comprise a computer processor (20) integrated with the electronic database (10). The computer processor (10) and electronic database (20) may be part of a local area network with a plurality of remote user interfaces and a remote work station as shown in FIG. 2. It should be understood that the apparatus could be configured to operate on the Internet using a server (30) or other wide area network as shown in FIG. 3. As depicted in FIG. 4, the apparatus may also comprise a computer software program (40) stored on a computer readable medium such as a disk, the computer program being adapted to be used on a computer (32) to assist in the fitting process as previously described. As shown in FIG. 5, in one embodiment, the computer program (40) will be adapted to facilitate the storage of data, including educational and product information, to receive and process the information that the customer inputs and to interactively search for, retrieve data and output the data to the customer. In a further embodiment, the computer program (40) could be downloaded onto a computing device (such as a PDA or cellular phone) from the Internet or other wide area network.

As shown in FIG. 2, the user interface may be located in a fitting room of a store, or in another private location where customers can try clothes on. If the apparatus is being used as an Internet, or other wide network application, the electronic interface could be located in a location of the customer's choice such as the customer's residence.

As shown in FIG. 6, the apparatus can also be used with a scanning system (25) that allows the interactive system to identify products, sizes and all pertinent information specific to that inventory unit that the customer has with them in the fitting room or in the store. The scanner (25) is utilized by scanning an identification means attached to the product such as a tag or label. This system can also track available inventories and help to match the consumer with the product that will provide the desired fit.

In one embodiment the apparatus has a means for storing the information input by the customers. By collecting, storing and analyzing the data entered by the customers, the manufacturers and retailers will be able to better ascertain what their customers want and need. For example, if a large percentage of customers that wear the 36–40 C size bras find that in this range the bras are designed with too little separation between the cups, this problem would become apparent based on the responsive information on fit and feel collected from the customers. The apparatus gives manufacturers and retailers the ability to learn and improve the product accordingly.

The apparatus can also be used in conjunction with measuring devices (27). For example, disposable sanitary measuring bands may be used in conjunction with the present apparatus to determine measurements that can be input by the customer to assist in the fitting analysis and process.

A method of assisting a customer with the fitting of a bra using of one embodiment of the apparatus will now be described. For ease of reference, a method of use in a changing room of a store will be described however, such description is not intended to be limiting and it should be understood that apparatus and method may be utilized in a variety of locations.

The customer enters the changing room, with or without products. The customer initiates contact with system using the user interface in the fitting room and enters personal information using the user interface in response to questions and prompts displayed on the interface as depicted in FIG. 5. The questions and prompts are designed to elicit information that can be used to evaluate what type of bra will fit the customer and to assess what educational information would benefit the customer. The personal information input may include self-measurement information. The self-measurement information may include without limitation; ribcage measurement information obtained by measuring immediately below the bust; top of chest measurement information obtained by measuring above the bust and under arms high on the back; and bust measurement information obtained by measuring around the back and over fullest part of the breast. In one embodiment of the present invention, the customer is guided through a self-measurement process by following questions displayed on the electronic interface and if available, the customer may use a measuring device to obtain the self-measurement information. The customer can also be prompted to enter information about desired designs and styles of bra, preferred colours, preferred fabrics and intended uses.

The questions presented to the customer may also include questions about the customer's history of brassiere wear and problems related to brassiere wear including, but not limited to, questions about posture problems, breast shape deterioration, headaches, back pain, skin chaffing, breast tenderness, poor circulation, shoulder strain, chaffing and lymphedema. The customer will also be asked to enter information about special circumstances and conditions that could impact the fit, wear or selection of a brassiere such as nursing, pregnancy, menstrual cycle, breast growth, mastectomies and other conditions that could impact the selection of a brassiere. The previously described questions are not intended to be an exhaustive listing, and it should be understood that other suitable questions may be asked that would elicit appropriate information that can be used to evaluate what type of bra will be appropriate for and fit the customer and to assess what educational information would benefit the customer.

The customer inputs the personal information in response to the prompts or questions through the user interface. The means used to input the information may include touching an interactive screen, typing responses on a key pad, using a mouse, or speaking into a microphone. The apparatus processes the information input by the customer and searches for and retrieves information (or further questions and prompts if required) from the database, communicating the retrieved information to the customer through the user interface. The information may be output to the customer using any number of suitable mediums including digital images, photographs, diagrams, descriptions, video, visual displays or audio stimuli.

The information available to be communicated includes information about suggested bra products, educational information on bras and bra fitting, and further questions and prompts to guide the customer through the fitting process.

The educational information stored and available for retrieval may include information on self-measurement, fitting and wearing a bra, and specific information about the proper angle of a brassiere, the proper center front fit, the proper frame and side fitting or positioning, the proper strap selection, adjustment and placement, positioning and proper fit of cups. There may also be information available for retrieval about proper method of putting on a brassiere including the placement of breasts in cups, selection of band tightness and strap adjustment. Information may also be available about methods of fit and wear relating to special situations including nursing bras, pregnancy, menstrual cycle, mastectomies, bustiers and long-lines.

The educational information stored and available for retrieval may include information about physical problems related to bra wearing in general, and information about physical problems related to wearing the wrong size of bra including without limitation; adverse effects relating to posture, breast tissue and breast shape, headaches, back pain, breast tenderness, poor circulation, shoulder strain, skin chaffing and lymphedema, and possible solutions thereof.

The information about suggested bra products stored and available for retrieval may include information regarding the styles and types of brassieres and proper wear and fashion information. More particularly, this information may include information on cup styles, frame styles, strapless bras, wide-away bras, halter bras, sports bras, minimizer bras and racer-back bras. More specific cup style information may include information about seamed cups, seamless cups, contour cups, stretch cups, demi-cups, soft cups, underwire cups, padded cups, padded push-up cups, full cups, balconette cups, and plunge cups. More specific frame style information may include information about full support frames, light support frames and front closure frames.

The previously described information is not intended to be an exhaustive listing, and it should be understood that other suitable information about bras, and bra fitting issues may be stored and be available for retrieval and communication to the customer.

The customer can utilize the information provided to select what they believe to be a bra, or bras that will fit. It should be noted that a customer might have already chosen a bra, or bras, to try on prior to entering the changing room (based on the information provided, the customer may choose to select additional or different bras). The customer then tries on the bra, or bras. At this point, the customer is guided through a series of questions and prompts requiring further responses and information input from the customer about the feel and fit of the bra. The questions are designed to elicit responses that will permit analysis of the fit and feel of the bra, in particular to permit determination of the proper angle of the bra, the proper center front fit, the proper frame and side fitting or positioning, the proper strap selection, the proper adjustment and placement and the proper positioning and fit of the cups. The customer input is processed and analyzed and further questions, or relevant information is communicated to the customer. The customer then selects a bra based on the information and suggestions provided by the apparatus. The latter part of the process involving the customer input on the fit and feel of the bra may be repeated if a number of bras are being tried on.

Eventually, based on the product suggestions, based on the information provided, and based on the fit and feel of the bras tried on, the customer selects a product.

As will be apparent to those skilled in the art, various modifications, adaptations and variations of the foregoing specific disclosure can be made without departing from the scope of the invention claimed herein.

What is claimed is:

1. A method of assisting a customer with the fitting of a bra, the method comprising the steps of:
   (a) the interactive input of information by the customer;
   (b) the search and retrieval of information from an electronic database based on the information input by the customer, the electronic database containing product information and educational information; and
   (c) the output of the information retrieved from the electronic database to the customer;
   wherein the educational information includes information about fitting and wearing a bra.

2. The method of claim 1 wherein the educational information includes information about the proper method for putting on a bra.

3. The method of claim 1 wherein the educational information includes information about methods of fit and wear relating to special situations.

4. The method of claim 1 wherein the educational information includes information about proper fits and methods of wear for various types and styles of bras.

5. The method of claim 1 wherein the educational information includes information about physical problems related to bra wearing in general and related to wearing the wrong size of bra.

6. The method of claim 1 wherein the educational information includes information about possible solutions to physical problems related to bra wearing.

7. The method of claim 1 wherein the educational information includes information about wearing the wrong size of bra.

8. The method of claim 1 wherein the educational information includes information about fashion and bra selection as it relates thereto.

9. The method of claim 1 wherein the product information includes information about proper self-measurement of the breasts for the purposes of attaining a properly fitting bra.

10. The method of claim 1 wherein the product information includes information about varying styles and types of bras.

11. The method of claim 1 wherein the product information includes inventory information about specific bra products.

12. The method of claim 1 wherein the product information includes information about proper wear and fashion.

13. The method of claim 1 wherein the product information includes information about the dimensions of varying styles and sizes of bras.

14. The method of claim 1 wherein the information inputted by the customer includes personal information.

15. The method of claim 14 wherein the personal information includes self-measurement data.

16. The method of claim 15 wherein the customer uses a measuring device to obtain the self-measurement data.

17. The method of claim 14 wherein the personal information inputted by the customer includes information about fit and feel of bras that the customer is trying on.

18. The method of claim 14 wherein the personal information inputted by the customer includes information about desired styles of bra and intended uses.

19. The method of claim 14 wherein the personal information inputted by the customer includes information about the customer's history of bra wear.

20. The method of claim 1 wherein the customer inputs information using a user interface.

21. The method of claim 20 wherein the user interface is located in a fitting room or other private area within a store.

22. The method of claim 20 wherein the user interface is located in the customer's home.

23. The method of claim 1 wherein the information retrieved from the electronic database is output to the customer using the user interface.

24. The method of claim 1 wherein the information retrieved from the electronic database is output to the customer using any of the following mediums:
   (a) digital images;
   (b) photographs;
   (c) diagrams;
   (d) descriptions;
   (e) text;
   (f) video; or
   (g) audio stimuli.

25. The method of claim 1 comprising the further step of outputting prompts or questions to the customer to elicit the input of specific information by the customer.

26. The method of claim 25 wherein the questions and prompts are visually displayed on the user interface.

27. The method of claim 25 wherein the questions and prompts comprise audio stimuli.

28. The method of claim 25 wherein the customer is guided through a self-measurement process by following the prompts and questions.

29. The method of claim 25 wherein the questions include questions about any of:
    (a) the customer's history of bra wear;
    (b) the problems normally associated with bra wear; and
    (c) the problems not normally associated with bra wear.

30. The method of claim 25 wherein the questions include questions about special circumstances and conditions that could impact the fit, wear or selection of a bra.

31. The method of claim 25 wherein the questions and prompts presented to the customer about the feel and fit of the bra are directed towards determining any number of the following:
    (a) the proper angle of the bra;
    (b) the proper center front fit;
    (c) the proper frame and side fitting or positioning;
    (d) the proper strap selection;
    (e) the proper adjustment and placement; and
    (f) the proper positioning and fit of the cups.

32. The method of claim 1 further comprising the step of recording the information input by the customer.

33. A method of assisting a customer with the fitting of a bra, the method comprising the steps of:
    (a) the input of personal information by a customer;
    (b) the search and retrieval of information from an electronic database based on the information input by the customer, the electronic database containing product information and educational information;
    (c) the output of the information retrieved from the electronic database to the customer;
    (d) the customer selecting a bra to try on based on the information provided by the database;
    (e) the customer trying the bra on;
    (f) the input of information about the feel and fit of the bra by the customer;
    (g) the search and retrieval of information from the electronic database based on the information input by the customer;
    (h) the output of the information retrieved from the electronic database to the customer; and
    (i) if the feel and fit of the bra is not correct, repeat steps (d)–(h) until the customer has tried on a correctly fitting bra.

34. A method of assisting a customer with the fitting of a bra, the method comprising the steps of:
    (a) the input of personal information by a customer using a user interface in response to questions and prompts displayed on the user interface;
    (b) the search and retrieval of bra product information and educational information on bras and bra fitting from an electronic database based on the personal information provided by the customer;
    (c) the output of the retrieved bra product information, or the educational information, or both, depending on customer selection to the customer through the user interface;
    (d) the customer selecting a bra to try on using the retrieved bra product information, or the educational information, or both;
    (e) the customer trying on the bra;
    (f) the input of information about the feel and fit of the bra by the customer using the user interface in response to questions and prompts displayed on the interface;
    (g) the search and retrieval of bra product information and educational information on bras and bra fitting from the electronic database based on the information about the feel and fit of the bra input by the customer;
    (h) the output of the retrieved bra product information, or the educational information, or both, depending on customer selection to the customer through the user interface; and
    (i) the selection of a correctly fitting bra by the customer.

35. A networked server system for assisting a customer with the fitting of a bra comprising:
    (a) a remote work station comprising a data storage medium including a memory database comprising information about bra products, educational information on bras and bra fitting, questions about personal information of the customer, and questions about the fit and feel of a bra, and a means for searching and retrieving specific data from the database in response to information input by the customer;
    (b) means for the customer to input information to the remote work station; and
    (c) means for communicating the data retrieved from the database to the customer.

36. The apparatus of claim 35 wherein the network is the world wide web, LAN or WAN.

37. The apparatus of claim 35 further comprising a means of storing the information inputted by a customer.

38. The apparatus of claim 35 further comprising a scanner for identifying products by scanning identification means attached to products.

39. The apparatus of claim 35 further comprising a measuring device for obtaining personal measurement information from the customer.

40. The apparatus of claim 35 wherein the means for the customer to input information and the means of communicating the data comprises a user interface.

41. A computer system for assisting a customer with the fitting of a bra comprising:
    (a) a data storage medium including a memory database comprising information about bra products, educational information about fitting and wearing a bra, questions about personal information of the customer, and questions about the fit and feel of a bra;
    (b) means for the customer to input information;
    (c) selection means for searching and retrieving specific data from the database in response to the information input by the customer; and
    (d) means for communicating the data retrieved from the database to the customer.

42. A computer program stored on a computer readable medium for assisting a customer with the fitting of a bra, said computer program adapted to:
    (a) store data including information about bra products, educational information on bras and bra fitting, questions about personal information of the customer, and questions about the fit and feel of a bra;
    (b) receive and process information inputted by the customer;
    (c) search and retrieve specific data in response to the information inputted by the customer; and
    (d) output the retrieved data to the customer.

* * * * *